3,425,956
PROCESS FOR PREPARING MOLECULAR SIEVE CONTAINING CRACKING CATALYSTS
Richard W. Baker, Ellicott City, and Frank G. Ciapetta, Silver Spring, Md., Charles P. Wilson, Jr., Cincinnati, Ohio, and Philip K. Maher, Baltimore, Md., assignors to W. R. Grace & Co., New York, N.Y., a corporation of Connecticut
No Drawing. Continuation-in-part of applications Ser. No. 242,892, Dec. 7, 1962, Ser. No. 355,101, Mar. 26, 1964, and Ser. No. 387,186, Aug. 3, 1964. This application Feb. 8, 1965, Ser. No. 431,162
U.S. Cl. 252—455          5 Claims
Int. Cl. B01j 11/40

ABSTRACT OF THE DISCLOSURE

Molecular sieve promoted silica alumina cracking catalysts are prepared by admixing crystalline zeolite with a silica alumina slurry, and subsequently sequentially washing, heating, and washing the slurry to reduce the alkali metal oxide content thereof to below about 0.5%.

---

This application is a continuation-in-part of applications Ser. No. 242,892, filed Dec. 7, 1962 now abandoned, and Ser. No. 355,101, filed Mar. 26, 1964 now abandoned, and Ser. No. 387,186, filed Aug. 3, 1964, now abandoned.

This invention relates to a process for preparing a fluid cracking catalyst having high thermal and steam stabilities. In one particular embodiment, it relates to a process for preparing a catalyst having high cracking activity maintenance during cracking operations.

In summary, the process of this invention is a method for preparing a silica-alumina cracking catalyst promoted with from about 2 to 90 peercent of a crystalline zeolite which comprises adding to a silica-alumina slurry containing at least about 5 percent alumina based on the total weight of the silica and alumina, a crystalline stabilized zeolite having the following basic formula, expressed as mole ratios of oxides:

$$(XR_2O + YM_{2/n}O) : Al_2O_3 : 3.5\text{–}7 SiO_2 : ZH_2O$$

where R is an alkali metal ion, X is from 0.1 to 1, M is H+ or a metal cation with the exception of alkali metal cations and $n$ is its valence, Y is within the range of from 0 to 0.9, and Z is within the range of from 0 to 9; filtering the composite; reslurrying and spray-drying the composite; washing the spray-dried composite with a dilute ammonium sulfate solution whereby the alkali metal content of the zeolite is substantially reduced and is less than 3 percent based on the weight of the zeolite; and rinsing the composite with water which is substantially free of sulfate ions.

Catalytic cracking of pretroleum oils comprises contacting hot oil vapors with a solid catalyst under controlled conditions of temperature and pressure, forming reaction products including coke, gases, gasoline hydrocarbons, and higher boiling hydrocarbons. The coke-like material which is deposited on the catalyst is then burned off with a stream of air or other oxygen containing gas at elevated temperatures, thereby regenerating the catalyst for reuse.

The high temperature and the presence of steam in the regenerating step tend to deactivate the catalyst by lowering its surface area and pore volume. Thus, cracking catalysts must both be catalytically active and structurally stable at elevated temperatures in the presence of steam.

In application, Ser. No. 355,101, filed Mar. 26, 1964, we disclosed that a greatly improved catalyst with high thermal and steam stability could be prepared by incorporating into the catalyst from 5 to 25 percent of the crystalline zeolite, known as Z–14 US zeolite. Z–14 US is a unique zeolite composition which is ultra-stable to high temperature thermal and steam treatments and is characterized by the fact that it contains less than one percent $R_2O$ by weight where R is Na+, K+ or any other alkali metal ion. Another distinguishing feature of this unique zeolite composition is the unit cell size. The Z–14 US is characterized as having a cubic unit cell of 24.20 to 24.45 angstrom units. It is further characterized by having a water adsorption at 25° C. and 10 percent relative humidity of 6 to 7.2 grams of water per 100 grams of zeolite. The basic formula for the Z–14 US crystalline zeolite may be represented as follows:

$$XM_{2/n}O : Al_2O_3 : 3.5\text{–}7 SiO_2 : YH_2O$$

where M represents H+ or any other cation except the alkali metal cation and $n$ is its valence, where Y can vary from 0 to 9, and X from 0 to 1.

A process wherein the alkali metal ion concentration in the zeolite component was reduced to less than one percent by weight prior to its incorporation in the catalyst matrix has been previously disclosed. Alkali metal removal to these low levels was found to be a difficult and expensive procedure.

It is one object of this invention to provide a process for preparing a cracking catalyst promoted with suitable crystalline zeolites.

It is another object of this invention to provide a simpler and more economical method for preparing a cracking catalyst having high thermal and steam stabilities.

The essence of this invention resides in the addition of a crystalline zeolite to the catalyst and in the process of preparing the catalyst. Although our invention will be described using a commercial silica-alumina cracking catalyst containing above about 5 percent and preferably above about 13 percent alumina, suitable results can also be obtained using other cracking catalysts. Examples of other catalysts suitable for the process of this invention include silica-alumina containing up to 95 percent alumina, silica-zirconia, silica-magnesia, silica-alumina-zirconia, silicia-alumina-magnesia, and catalysts made from clay as well as semi-synthetic catalysts containing clay. The zeolite can also be incorporated into pure metal oxides such as silica or alumina.

In the process of this invention, a catalyst matrix containing a crystalline zeolite is formed. The crystalline zeolite can be incorporated into the catalyst matrix by several techniques. For example, the procedure found to be most convenient involves adding the crystalline zeolite to the filter feed prior to filtration. The crystalline zeolite can also be added to the spray-dried slurry or to the sodium silicate solution prior to gelation.

The subsequent steps of the process depend, to some extent, upon the particular zeolite added to the catalyst matrix and the particular thermal stability of the final catalyst which is desired. However, all of the particular variations involve the step of washing the composite with a dilute ammonium salt solution until the alkali metal content of the composite is reduced to a predetermined level, whereby the thermal stability of the zeolite contained in the catalyst matrix is greater than the thermal stability of the zeolite when it was originally incorporated into the catalyst matrix. By means of this treatment, the thermal stability of the zeolite is increased in situ.

The zeolite which is added to the catalyst can be characterized as a synthetic faujasite having the following basic formula, expressed in terms of mole ratios of oxides:

$$(XR_2O+YM_{2/n}O):Al_2O_3:3.5-7SiO_2:0-9H_2O$$

wherein R is an alkali metal ion, K is from about 0.1 to 1, M is H+ or a metal cation other than an alkali metal cation and $n$ is its valence, and Y is within the range of from 0 to 0.9. Suitable zeolites, wherein X is one, and exchange products thereof, wherein X is less than one, are known and disclosed in application Ser. No. 131,734, filed Aug. 16, 1961, now abandoned (X–14 HS zeolite), and Patent No. 3,130,007. Suitable stabilized zeolites wherein R in the above formula is from 0.1 to 0.3, for example, are disclosed in copending applications, Ser. No. 318,240, filed Oct. 23, 1964, now Patent No. 3,259,978, and Ser. No. 396,754, filed Sept. 15, 1964, now abandoned. This stabilized zeolite is characterized as being a synthetic faujasite having an alkali metal content, expressed as alkali metal oxides, of greater than 1 percent and up to about 4 percent by weight. The zeolite can contain varying amounts of cations other than alkali metal ions, or it can be essentially free of these other cations. Suitable cations include magnesium, manganese, zinc, thorium, uranium, aluminum, yttrium, the rare earths, etc. From 2 to 90 and preferably from 5 to 25 percent zeolite is introduced into the catalyst matrix, based on the weight of the final catalyst.

For purposes of simplicity, this invention will be described using the commercially available silica-alumina cracking catalyst as the matrix material and the addition of the zeolite to the filter feed. Briefly summarizing the process steps in a typical preparation according to this invention, concentrated sodium silicate with a weight ratio of $SiO_2$ to $Na_2O$ of about 3.25 to 1 is diluted with water to a $SiO_2$ content of about 3 to 8 percent and preferably 4 to 5 percent. The silica is gelled with sulfuric acid or with carbon dioxide at any temperature up to 165° F., preferably from about 100 to 135° F. Following gelation, an aluminum sulfate solution is added to the gelled sodium silicate. When the silicate has been gelled with carbon dioxide, the concentration of the aluminum sulfate solution is sufficient to react with all the alkali originating from the sodium silicate which has been converted by the carbon dioxide to sodium carbonate. Gaseous carbon dioxide released from the system during this reaction is recovered and recycled for gelation of additional sodium silicate.

At this stage of the process, the alumina has been precipitated, and the silica-alumina slurry is ready for filtration. The zeolite can be added to the composite at this point. The silica-alumina composite containing the zeolite is then filtered. The filter cake containing the zeolite is then reslurried with a minimum quantity of water to form a slurry of maximum silica-alumina content suitable for spray drying, and the slurry is spray dried.

Thermal stability of the catalyst matrix is increased by washing the spray-dried composite with a dilute ammonium salt solution. The extent of washing is determined by the remaining alkali metal content of the matrix and the alkali metal content of the zeolite promoter approximated therefrom. Various washing procedures have been found satisfactory. The composition can be subjected to multiple rinsing with the ammonium salt solution, can be soaked in the solution, or can be subjected to combinations of the rinsing and soaking steps. The term "washing" is defined as including both rinse and soak procedures with dilute ammonium salt solutions.

The alkali metal contents to which the catalyst matrix is lowered by washing varies with the particular zeolite promoter employed and the thermal stability desired of the product. When the zeolite promoter employed has an alkali metal content greater than 3 percent, the washing can be continued until the alkali metal content of the zeolite is calculated to be from about 1 to 3 percent. If lower alkali metal contents are desired with such a promoter, the catalyst matrix is heated to a temperature of from 1000 to 1600° F. at this stage of the process, and the composite is washed until the alkali metal content reaches the desired level.

The alkali metal content of the catalyst matrix is directly related to the thermal stability of the catalyst. Alkali metal contents of from 1 to 3 percent based on the weight of the zeolite promoter in the catalyst provide improved thermal stabilities over higher alkali metal contents and provide a useful cracking catalyst. However, in many uses thermal stability at temperatures in excess of 1600° F. is required. In certain types of cracking processes, catalysts are subjected to these severe temperatures during the regeneration step. Catalyst alkali metal contents of less than 0.5 percent are desirable in order to provide thermal stability at temperatures in excess of 1600° F. As described above, alkali metal contents below 0.5 percent can be obtained from catalysts promoted with zeolites containing more than 3 percent alkali metal by the washing-heating-washing technique.

Also, the highly stable catalyst can be obtained by a direct washing technique from catalysts promoted with stabilized zeolites containing from 1 to 3 percent alkali metal such as are disclosed in application Ser. No. 396,754, filed Sept. 15, 1964.

The final washed composition is then rinsed with distilled water, preferably ammoniated distilled water, and dried. Generally, the final drying is obtained by conventional flash-drying techniques.

The preferred form of the catalyst is the powder obtained as the final dried product, a form which is suitable for commercial petroleum fluid cracking processes. The powders can be mixed with conventional binders and can be agglomerated, pilled or extruded to form granules, pills, or extrudates which can be used in other cracking processes.

The catalytic cracking activity and stability of the catalyst product were determined as follows:

A sample of the catalyst was treated in an atmosphere of steam at atmospheric pressure and at 1225° F. for a period of 20 hours, and the surface area and pore volume of the treated catalyst was determined. A portion of the above steam-treated catalyst was subjected to a further treatment comprising contacting the catalyst with a gas stream consisting of 25 percent steam and 75 percent air for 18 hours while maintaining the catalyst at a temperature of 1520° F. The surface area and pore volume of this material was also determined. Separate samples of the initial catalyst produced by the process of this invention were also subjected to 3 hour thermal treatments at 1000°, 1350°, 1550°, 1650°, 1700° and 1750° F. Surface area and pore volume data were determined on each of the samples using the well-known Brunauer-Emmett-Teller method (S. Brunauer, P. Emmett and E. Teller, J. Am. Chem. Soc. 60, 309 (1938)).

The cracking activity of the catalyst was determined in a fixed, fluidized-bed pilot cracking unit which was operating at 920° F. The feed used was West Texas heavy gas oil. The unit was operated with a catalyst to oil ratio of 4, and weight hourly space velocities of 5 to 10. The volume percent conversion of the feed and the distribution of the products and other data were calculated in each case.

The invention is further illustrated by the following specific, but non-limiting examples.

Example 1

This example illustrates the procedure for preparing the catalyst of the instant application. A dilute sodium silicate solution was prepared to contain 16.8 g./l. of $Na_2O$ and 55.7 g./l. of $SiO_2$. This solution was pumped at a rate of 1 gal./min. into a reaction coil into which $CO_2$ was passed at a rate such that gelation occurred in 15 sec. at a temperature of 116° F. The solution was pumped with continuous gelation for 30 minutes and then was cut out of the receiving tank. The silica gel was then aged for 1 hour at 115° F. The pH of the gel at this point was 9.8, and the slurry was adjusted to 95 liters.

An aluminum sulphate solution was prepared which contained 98.5 g./l. of $Al_2O_3$ and 30 g./l. of free sulfuric acid. A charge of 8000 cc. of this solution was added to the gelled silicate. The pH after the alum addition was 5.2. The pH of the batch was next adjusted to 4.8 by the addition of 500 cc. of a 10% sulfuric acid solution. The batch was cooled to 80° F. and diluted to 100.5 liters with water.

The stabilized Z–14 HS zeolite added to the gel had a chemical analysis as follows:

TABLE I

| Chemical analysis: | Wt. percent |
| --- | --- |
| Total volatiles at 1750° F. | 0.5 |
| $SiO_2$ (dry basis) | 64.6 |
| $Al_2O_3$ (dry basis) | 22.0 |
| $Na_2O$ (dry basis) | 3.1 |

A stabilized Z–14 HS zeolite slurry was prepared by adding 1070 g. of the zeolite to sufficient water to make a total of 3,400 g. of slurry. The slurry was added to the 100.5 liters of gel slurry. The mixture was circulated for 30 minutes and was then filtered. The filter cake was reslurried with 11 liters of water, pumped through a commercially available homogenizer operating at 2000 p.s.i.g., and was then spray dried.

An analysis of the size of the particles of the spray dried material showed that 65.6 wt. percent passed through a 200 mesh screen. A sample of the spray dried product was reslurried with water and the pH was found to be 4.9.

Example 2

This example shows the use of the ammonium sulfate rinse technique, and the sodium removal obtained.

A 200 gram sample of the spray dried material of Example 1 was given 5 rinses with a 2° Bé. ammonium solution at 135° F. The pH of the solution was 4.6, and the liquor to spray dried material weight ratio was 5 to 1. Then the material was subjected to 3 rinses with ammoniated distilled water having a pH of 8.5 and a temperature of 135° F. The product was then flashed dried and had a analysis as follows:

TABLE II

| Chemical analysis: | Wt. percent |
| --- | --- |
| Total volatiles at 1750° F. | 3.87 |
| $Al_2O_3$ (dry basis) | 15.18 |
| $Na_2O$ (dry basis) | .187 |
| $SO_4$ (dry basis) | .09 |

Example 3

A 200 g. sample of the spray dried product of Example 1 was washed as described in Example 2 except that the composite was subjected to 10 ammonium sulfate rinses. The chemical analysis of the product was as follows:

TABLE III

| Chemical analysis: | Wt. percent |
| --- | --- |
| Total volatiles at 1750° F. | 4.46 |
| $Al_2O_3$ (dry basis) | 15.18 |
| $Na_2O$ (dry basis) | .154 |
| $SO_4$ (dry basis) | .09 |

Example 4

This example shows the use of the ammonium sulfate rinse-soak-rinse washing technique, and the sodium removal obtained.

A 200 gram sample of the spray dried material of Example 1 was given 5 washes with 2° Bé. ammonium sulfate solution having a temperature of 135° F. and a pH of 4.6. The solution to catalyst composite weight ratio was 5 to 1. The composite was then immersed in a 2° Bé. ammonium sulfate solution for a 30 minute soak at 170° F., the pH of the solution being 4.5. The soak step was followed with 5 additional rinses with the ammonium sulfate solution. Thereafter, the composite was rinsed 3 times with ammoniated distilled water having a pH of 8.5 and a temperature of 135° F. The analysis of the washed product was as follows:

TABLE IV

| Chemical analysis: | Wt. percent |
| --- | --- |
| Total volatiles at 1750° F. | 5.28 |
| $Al_2O_3$ (dry basis) | 15.18 |
| $Na_2O$ (dry basis) | .119 |
| $SO_4$ (dry basis) | .32 |

Example 5

This example shows the use of the ammonium sulfate soak washing technique and the sodium removal obtained.

A 200 gram sample of the spray dried composite of Example 1 was soaked for 30 minutes with a 2° Bé. ammonium sulfate solution having a temperature of 170° F. and a pH of 4.5, the solution to catalyst composite weight ratio being 5 to 1. The soaked material was subjected to 3 rinses with distilled water without ammonia and was flash dried. The chemical analysis of the product was as follows:

TABLE V

| Chemical analysis: | Wt. percent |
| --- | --- |
| Total volatiles at 1750° F. | 4.25 |
| $Al_2O_3$ (dry basis) | 15.08 |
| $Na_2O$ (dry basis) | .341 |
| $SO_4$ (dry basis) | 1.05 |

Example 6

In this example a 200 gram sample of the spray dried composite of Example 1 was subjected to a 30 minute soak in ammonium sulfate solution such as is described in Example 5 and was then rinsed 5 times with ammonium sulfate solution such as is described in Example 2. The composite was then subjected to 3 rinses with ammoniated distilled water having a pH of 8.5 and a temperature of 135° F., and was flash dried. The analysis of the product was as follows:

TABLE VI

| Chemical analysis: | Wt. percent |
| --- | --- |
| Total volatiles at 1750° F. | 3.87 |
| $Al_2O_3$ (dry basis) | 15.06 |
| $Na_2O$ (dry basis) | .169 |
| $SO_4$ (dry basis) | .06 |

Example 7

In this example, the thermal and steam stabilities of the composite formed by the process of this invention are shown. Samples of the material prepared in Example 4 were subjected to a series of 3 hour thermal treatments at 1000°, 1350°, 1550°, 1650°, 1700°, and 1750° F. Another sample of the catalyst was steamed for 20 hours at 1225° F. and was then treated in a flowing gas stream comprising 25% steam and 75% air for 18 hours at 1520° F. This pilot plant-produced silica-alumina catalyst containing the zeolite product and was compared to a conventional silica-alumina catalyst containing about 13% alumina which did not contain Z-14 US zeolite. The surface area and pore volume of the treated composites were measured, and the data are set out in Table VII below:

TABLE VII

[Surface area in m.²/g.; pore volume in cc./g.]

| Physical properties after calcination 3 hours at— | Product of this example | Conventional silica-alumina catalyst containing about 13% alumina |
|---|---|---|
| 1,000° F | Surface area, 492 | 539 |
| | Pore volume, 0.81 | 0.75 |
| 1,250° F | Surface area, 474 | 514 |
| | Pore volume, 0.77 | 0.74 |
| 1,550° F | Surface area, 416 | 366 |
| | Pore volume, 0.70 | 0.58 |
| 1,650° F | Surface area, 348 | 245 |
| | Pore volume, 0.62 | 0.39 |
| 1,700° F | Surface area, 243 | 164 |
| | Pore volume, 0.38 | 0.26 |
| 1,750° F | Surface area, 149 | 80 |
| | Pore volume, 0.16 | 0.16 |
| 1,225° F. in steam followed by 1,520° F. in steam and air. | Surface area, 151 | 98 |
| | Pore volume, 0.51 | 0.40 |

The superior stability of the catalyst produced by the process of this invention is readily apparent from the above data. Despite an initial lower surface area after treatment at 1000° F., the catalyst produced by the process of this invention exhibited a generally higher surface area and improved pore volume, after treatment at all temperatures above 1550° F. The higher surface area and improved pore volume was also maintained after steam treatment at 1225° F. followed by a mixed steam-air treatment at 1520° F.

Example 8

The catalytic properties of the composite produced in Example 17 and a commercial high-alumina catalyst (27.4% alumina) were compared to a series of runs. Both catalysts were deactivated prior to being introduced into the test units by a 20 hour steam treatment a 1225° F. followed by an 18 hour treatment at 1520° F. in a flowing stream comprising 25% steam and 75% air. The evaluation was made in fixed fluidized bed cracking units. The feed for these evaluations was a 27.0° API West Texas Devonian heavy gas oil having a boiling range of from 641° to 885° F. In each of these runs, the catalyst charge was 150 grams. The catalyst to oil weight ratio was 4. The unit was operated at 920° F. and a weight hourly space velocity of 5. The results obtained were as follows:

TABLE VIII.—PRODUCT DISTRIBUTION AND PROPERTIES

| | Product of this invention | Commercial silica-alumina catalyst containing 27.4% alumina |
|---|---|---|
| Percent conversion at 5 WHSV | 66.5 | 57.5 |
| Product distribution and properties: | | |
| Hydrogen (wt. percent) | 0.051 | 0.062 |
| C₁ and C₂'s (wt. percent) | 1.6 | 1.7 |
| C₃'s (vol. percent) | 9.6 | 9.6 |
| C₄'s (vol. percent) | 10.8 | 9.7 |
| C₅+ gasoline (vol. percent) | 56.0 | 47.0 |
| Gravity, °API | 56.3 | 56.4 |
| Aniline point, °F | 67 | 68 |
| Octane No. ASTM-D908: | | |
| Research | 93.3 | 94.4 |
| Research+3 cc. T.E.L.[1] | 98.4 | 99.1 |
| Motor | 78.5 | 79.5 |
| Motor+3 cc. T.E.L.[1] | 83.7 | 84.0 |
| No. 2 fuel oil (vol. percent) | 9.5 | 10 |
| Coke (wt. percent) | 3.9 | 3.7 |

[1] Tetraethyl lead.

These data show the superiority of the catalyst produced by the process of our invention over the 27.4% silica-alumina cracking catalyst. More of the feed stock, 9.0 volume percent, was cracked by the catalyst of the instant application than was cracked by the 27.4% silica-alumina cracking catalyst. Also, 9.0 volume percent more C₅+gasoline was recovered with the catalyst of this invention.

Example 9

This example illustrates the procedure for preparing the catalyst of this invention from a silica-alumina matrix containing 13% alumina promoted with Z-14 HS zeolite.

A silica-alumina gel slurry was prepared by the general procedure described in Example 1.

Z-14 HS zeolite was added to the silica-alumina gel in quantities sufficient to provide a catalyst matrix promoted with 7% zeolite. The zeolite employed had the following chemical analysis:

TABLE IX

| Chemical analysis: | Wt. percent (dry basis) |
|---|---|
| $SiO_2$ | 63.7 |
| $Al_2O_3$ | 22.5 |
| $Na_2O$ | 13.7 |

The zeolite was slurried with water and added to the silica-alumina slurry. The mixture was circulated until thoroughly mixed and filtered. The filter cake was reslurried with water, pumped through a commercially available homogenizer and spray-dried.

The spray-dried material was washed with ammonium sulfate solution until the sodium content, expressed as the oxide, was reduced to 0.13 percent (dry basis) and was then washed with water until the sulfate content was 0.28 percent. A portion of this material was dried and separated for testing (Sample A).

Another portion of the zeolite-promoted matrix was heated up to 1350° F. and was washed with ammonium sulfate solution until the sodium content expressed as the oxide was 0.056 percent (dry basis). The material was then washed with water until the sulfate content was 0.25 percent. This material was dried and tested (Sample B).

The surface areas of the treated composites were measured and are shown in Table X.

TABLE X

| Physical Properties after Calcination for 3 Hours at— | Surface Area, m.²/g. | |
|---|---|---|
| | Sample A | Sample B |
| 1,550° F | 373 | 393 |
| 1,650° F | 269 | 293 |
| 1,700° F | 158 | 172 |

As shown by the data in Table X, the process of this invention produces catalysts having a high thermal stability. Sample B, which had a lower alkali metal content, was more stable.

Example 10

The catalytic properties of the composites produced in Example 9 and a commercial silica-alumina cracking catalyst (27.4% alumina) were compared in a series of runs. Each catalyst was deactivated prior to being introduced into the test units by an 18 hour treatment at 1520° F. in a flowing stream comprising 20% steam and 80% air. The evaluation was made in fixed, fluidized-bed cracking units. The feed for these evaluations was West Texas heavy gas oil. In each of these runs the catalysts charge was 150 grams. The catalyst to oil ratio was 4. The unit was operated at 920° F. and with a constant coke to feed weight ratio of 3.6. The results obtained were as follows:

PRODUCT DISTRIBUTION AND PROPERTIES

|  | Sample A | Sample B | Commercial silica-alumina catalyst |
|---|---|---|---|
| Percent conversion at 3.6 wt. percent coke | 59.5 | 62.5 | 59.5 |
| Weight hours space velocity | 5.0 | 10.5 | 4.4 |
| Product distribution and properties: | | | |
| Hydrogen (wt. percent) | 0.046 | 0.041 | 0.070 |
| $C_1$ and $C_2$'s (wt. percent) | 1.5 | 1.2 | 2.3 |
| $C_3$'s (vol. percent) | 8.5 | 7.8 | 10.2 |
| $C_4$'s (vol. percent) | 9.0 | 9.5 | 11.1 |
| $C_5$+gasoline (vol. percent) | 49.5 | 54.5 | 46.5 |
| Gravity, °API | 55.3 | 55.9 | 56.8 |
| Aniline point, °F | 70 | 72 | 64 |
| Octane No. ASTM-D-908: | | | |
| Research | 92.2 | 92.4 | 94.0 |
| Research+3 cc.T.E.L.[1] | 98.0 | 97.7 | 98.4 |
| Motor | 79.0 | 78.0 | 77.9 |
| Motor+3 cc.T.E.L.[1] | 84.4 | 83.4 | 84.4 |
| No. 2 fuel oil (vol. percent) | 10.5 | 10.5 | 10.5 |

[1] Tetraethyl lead.

Obviously, many modifications and variations of the present invention can be made without departing from the essence and scope thereof, and only such limitations should be applied as are indicated in the claims.

We claim:
1. A process for preparing a silica-alumina cracking catalyst promoted with from 2–90% of a stable crystalline zeolite, said zeolite being characterized by stability at temperatures in excess of 1600° F., which comprises:
   (a) adding a crystalline zeolite to a silica-alumina slurry containing at least about 5% alumina based on the total weight of the silica and alumina, the crystalline zeolite having the following basic formula:

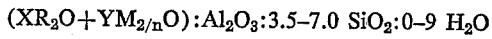

$(XR_2O + YM_{2/n}O): Al_2O_3 : 3.5–7.0\ SiO_2 : 0–9\ H_2O$ wherein R is an alkali metal ion, X is from 0.1 to 1, M is H+ or a metal cation with the exception of alkali metal cations, and n is the valence, and Y is within the range of from 0 to 0.9;
   (b) filtering the composite;
   (c) reslurrying and spray drying the composite;
   (d) washing the spray dried composite with a dilute ammonia salt solution until the alkali metal content of the composite, expressed as the alkali metal oxide is less than 3% based on the weight of the zeolite;
   (e) heating the washed composite to a temperature within the range of from 1000 to 1500° F., and
   (f) washing the heat treated composite with a dilute ammonia salt solution until the alkali metal content of the composite, expressed as the alkali metal oxide, is less than about 0.5%, rinsing the composite with water which is substantially free from sulfate ions, and drying the composite.

2. The process of claim 1 wherein the washing of the spray-dried composite comprises a plurality of rinses of the composite with a dilute ammonium sulfate solution.

3. The process of claim 1 wherein the washing of the spray-dried composite comprises soaking and rinsing of the composite with a dilute ammonium sulfate solution.

4. The process of claim 1 wherein from about 2 to about 25% of the crystalline zeolite is added.

5. The process of claim 1 wherein zeolite possesses a unit cell of 24.20 to 24.45 A.

References Cited

UNITED STATES PATENTS

| 3,130,006 | 4/1964 | Rabo et al. | 23—110 |
| 3,130,007 | 4/1964 | Breck | 23—113 |
| 3,140,251 | 7/1964 | Plank et al. | 208—120 |
| 3,271,418 | 9/1966 | Plank et al. | 252—455 XR |

DANIEL E. WYMAN, *Primary Examiner.*

CARL F. DEES, *Assistant Examiner.*

U.S. Cl. X.R.

252—451